United States Patent [19]

Chao

[11] Patent Number: 4,694,218
[45] Date of Patent: Sep. 15, 1987

[54] NON-GLAZE COATING FOR A CATHODE RAY TUBE

[75] Inventor: Paul Chao, Philadelphia, Pa.

[73] Assignee: Cotek Company, Philadelphia, Pa.

[21] Appl. No.: 817,867

[22] Filed: Jan. 13, 1986

Related U.S. Application Data

[62] Division of Ser. No. 607,270, May 4, 1984, Pat. No. 4,596,745.

[51] Int. Cl.$^4$ ............................................. H01J 29/88
[52] U.S. Cl. .................................... 313/478; 427/160; 428/428
[58] Field of Search ................ 313/478, 474; 428/428; 427/160

[56] References Cited

U.S. PATENT DOCUMENTS

| | | |
|---|---|---|
| 2,474,061 | 6/1949 | Moulton . |
| 2,584,905 | 2/1952 | Moulton et al. . |
| 2,655,452 | 10/1953 | Barnes et al. . |
| 2,680,205 | 6/1954 | Burton ................................. 313/478 |
| 2,782,676 | 2/1957 | Osterberg . |
| 3,094,436 | 6/1963 | Schröder ............................. 427/160 |
| 3,356,522 | 12/1967 | Libbert . |
| 4,161,547 | 7/1979 | Kienel . |
| 4,260,222 | 4/1981 | Kozawa . |
| 4,346,131 | 8/1982 | Yoldas ............................. 428/428 X |
| 4,361,598 | 11/1982 | Yoldas ............................. 427/160 X |

Primary Examiner—Palmer C. DeMeo
Attorney, Agent, or Firm—Steele, Gould & Fried

[57] ABSTRACT

A coating for reducing specular reflection on optical glass screens comprises a partially hydrolized metal alkoxide polymer. These alkoxides have the general formula M(OR)$_4$ where M is selected from the group consisting of silicon, titanium and zirconium where R is alkyl with 1 to 6 carbon. The equivalent titanium and/or zirconium oxides is about 15% of total solids by weight. A presently preferred coating mixture is prepared by dissolving tetraethyl orthosilicate in alcohol, at an elevated temperature; gradually adding a mixture of nitric acid and water; gradually adding titanium butoxide and/or zirconium n-propoxide; and, adding and mixing additional water and alcohol. The coating is applied by a method comprising the steps of cleaning the surface of the optical glass screen; preheating the glass screen; coating the solution onto the glass screen; and, baking the glass screen and solution, at a temperature high enough to drive off the solvent and bond the coating mixture to the glass surface.

5 Claims, 3 Drawing Figures

NON-GLAZE COATING FOR A CATHODE RAY TUBE

This is a division of application Ser. No. 607,270, filed May 4, 1984, now U.S. Pat. No. 4,596,745.

BACKGROUND OF THE INVENTION

1. Field of the Invention

This invention relates to the field of antiglare coatings in general, and in particular, to coating compositions, methods for preparing coating compositions and methods for applying coating compositions to optical glass surfaces. The invention is particularly directed to reducing specular reflection on the surfaces of cathode ray tubes, for example, computer monitor screens, television tubes, etc.

2. Description of Prior Art

Specular reflection or glare is defined as the direct reflection of ambient light from a smooth glass surface. Images on the screens of cathode ray tubes, for example television tubes, are formed behind the glass screen of the tube. Natural and artificial sources of light are reflected from the otherwise smooth glass surface of such screens, interfering with the images formed behind the glass surface. A strong source of sunlight, for example through an unshaded window, is likely to substantially wash out the entire picture. A local light source, for example a lamp, will tend to have its image reflected from the screen, superimposed on the image formed by the cathode ray tube (CRT). This creates a very disturbing local distortion.

Coatings have been applied to the surfaces of television tubes with a controlled roughness or surface pattern so that ambient light is scattered and diffused, thereby reducing glare. The roughness should not unduly degrade the resolution of the images to be viewed. A very practical consideration for coatings applied to CRT screens is that the glare-reducing coating should adhere to the glass surface, and should be sufficiently hard to resist abrasion and chemically resistant to moisture, humidity and common household cleaning solutions.

It is known in the art to reduce specular reflection with a vitrified, droplet pattern coating. Typically, an aqueous solution of an alkali silicate is sprayed in droplet form on a glass surface. The droplet pattern coating is dried and baked at an elevated temperature to provide a vitrified or glassy coating of corresponding pattern and surface contour. It is desirable to reduce the soda content in the vitrified coatings formed from such solutions in order to impart long-term stability against development of "bloom" on the coating surface. Such a solution is discussed in U.S. Pat. No. 3,114,668, which further teaches that picture or image resolution can be improved by incorporating a minor addition of boric oxide in the alkali silicate coating. Boric acid seemed to reduce the incidence of sharp-sided craters in the coating surface.

Another glare reducing coating is disclosed in U.S. Pat. No. 3,635,751, and is prepared by a method comprising the steps of: warming the surface of the glass screen to about 30° C. to about 100° C.; coating the warmed surface with an aqueous solution containing about 1 to 10 weight percent of a lithium-stabilized silica sol; drying the coating; and, heating the dry coating at about 150° C. to 450° C.

An improvement to the lithium silicate coating method is described in U.S. Pat. No. 3,940,511. It was observed that glare-reducing lithium silicate coatings on cathode ray tube face plates developed objectional be haze or "bloom" upon standing or storage at normal ambient humidities and temperatures. The haze is objectionable aesthetically and reduces the brightness and color fidelity of the transmitted image. A similar haze was observed for sodium and potassium silicate coatings that have been baked at temperatures of about 400° C. to about 500° C. It was further observed that some glare-reducing lithium-silicate coatings which contained light attenuating particles transmitted an image which appeared to have a brownish or other tint. In the method according to the improvement, the dry baked coating is washed or rinsed with hot water subsequent to the baking step. Washing the coating with hot water reduces or eliminates the tendency of the coating to form a haze or bloom. The washing was believed to remove soluble lithium compounds which were present in the coating. In order to correct for any tint in the transmitted image which might be imparted by the glare-reducing coating, the coating might also include a small amount of a color-correcting dye.

Glare-reducing coatings are also of interest in applications other than glass screens, for example, on the surfaces of semiconductor solar cells. The object of anti-reflective coatings in this application is to promote transmission of, and to prevent reflection back into the atmosphere of solar radiation. Proper coatings can reduce the amount of light reflected when applied in thicknesses of one quarter of a wave length. Such coatings, as described in U.S. Pat. No. 4,361,598, can be made from clear solutions which contain oxide constituents in a soluble polymerized form and from which uniform and continuous glass-like oxide films can be deposited on substrates at relatively low temperatures. Such a solution is prepared by reacting metal alkoxide with a mixture of critical amounts of water and/or acid in an alcohol diluted medium. Alkoxides may be Ti(OR)$_4$ or Ta(OR)$_5$, or another metal alkoxide such as Si(OR)$_4$ in admixture with these alkoxides. Acids may be HCl or HNO$_3$. Quarter wave inorganic optical coatings are deposited by applying the alkoxide solutions to a substrate and then heating the coating at a temperature above 350° C. Of course, glare reducing coatings for such solar cells must be bounded to a surface of silicon doped with germanium, for example, which can be expected to react differently than glass in bonding with surface coatings.

Image quality can be difficult to measure objectively, particularly in evaluating resolution and contrast. Specular reflection has been customarily measured in terms of gloss or glare, objectively, by a gloss meter. Specular reflection can also be measured subjectively in terms of lines per inch and correspondence to a standard pattern. A series of patterns, having different numbers of lines per inch can be projected onto a test panel and reflected to a viewer. The last pattern capable of being distinguished is a value or measure of the specular reflection.

The coatings and methods described herein are effective for producing anti-glare coatings on optical glass screens. The degree of glare reduction by coatings according to this invention has been determined both objectively and subjectively to be every bit as effective as the best known coatings of the prior art, and at the same time, can be prepared and applied at a significant cost savings. Accordingly, anti-glare coatings according to this invention provide very significant advantages over the prior art.

SUMMARY OF THE INVENTION

It is an object of this invention to provide coatings for reducing specular reflection on optical glass screens.

It is another object of this invention to produce coatings for reducing specular reflection an optical glass screens at a significant cost reduction.

It is still a further object of this invention to provide coatings for reducing specular reflection an optical glass screens at substantial savings and the coatings are as effective as any known in the prior art.

It is yet another object of this invention to provide solutions from which such coatings can be made.

It is yet another object of this invention to provide methods by which such solutions can be applied to optical glass screens to form such anti-glare coatings.

Briefly, this invention embodies anti-glare coatings for optical glass screens and the like and methods for preparing and applying such coatings, which are considerably less expensive than has been known in the art. Despite the savings in cost, the coating is just as effective in reducing specular reflection on optical glass screens as any coating now available.

In the presently preferred embodiment, an anti-glare coating according to this invention comprises a partially hydrolized metal alkoxide polymer. These metal alkoxides have the general formula $M(OR)_4$ where M is selected from the group consisting of silicon, titanium and zirconium, where R is alkyl with 1 to six carbon. The equivalent titanium and zirconium alkoxides form approximately 10% of the solids, by molar ratio, and approximately 15% of the solid, by weight. The coatings may be produced from a solution formed by creating a partially hydrolized tetraethyl orthosilicate or ethyl silicate 40 (TEOS) with metal alkoxides of titanium and zirconium in alcohol and water, nitric acid being used as a homogeneous catalyst. The solvent of the solution is alcohol, such as ethanol, propanol or higher alcohols. The higher alcohol yields a film or coating with less haze and less sensitivity to humidity. The presently preferred alcohol is 2-propanol. It has been noted that ethanol-based solutions will gel at room temperatures within a month and propanol-based solutions will not gel at room temperature. When ethanol-based solutions are stored at lower temperatures, time of gelation will be greatly extended. With regard to forming $TiO_2$, suitable starting components include titanium isopropoxide (TPT) and titanium butoxide (TBT). TBT is preferred as it is less sensitive to humidity.

The glass screen or panel to be coated is first cleaned, if necessary, and then preheated to a temperature in the range of approximately 20° C. to 75° C., higher temperatures producing a more defined surface topology, and therefore a greater diffusion effect. After the solution is sprayed onto the screen or panel, the screen or panel is baked at a temperature in the range of approximately 500° C. to 550° C., for a time period in the range of five to twenty minutes.

With reference to the schematic illustration of FIG. 3, the panel and coating must be baked for a sufficient period of time, and at a sufficient temperature, to drive off the alcohol and water molecules from the coating. As a result, the coating becomes densified and transformed into a glossy material. At the same time, this material bonds to the glass surface through M-O-Si bonding. Temperatures below 500° C. are insufficient to stabilize the coating by driving off the solvent and water molecules. Temperatures in excess of 550° C. may damage or distort the glass panel. It has been found that baking the panel at a temperature of approximately 520° C. for approximately five mintues, or 500° C. for approximately twenty minutes, is sufficient to completely stabilize and bond the coating to the glass screen or panel.

BRIEF DESCRIPTION OF THE DRAWINGS

Aspects of this invention are illustrated in the drawings, wherein.

Figure 1:
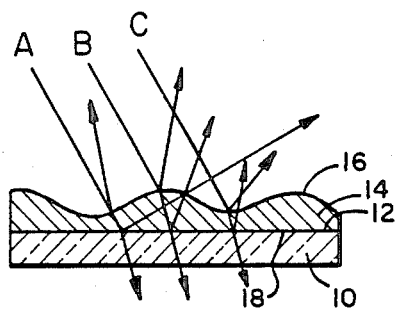
FIG. 1 is a section view of a panel to which an anti-glare coating according to this invention has been applied.

It will be appreciated that this invention is not limited to the precise arrangements, instrumentalities and methodology illustrated in the drawings.

DETAILED DESCRIPTION OF THE PREFERRED EMBODIMENTS

Anti-glare coatings have been applied to optical glass screens or panels in a textured, roughened, or otherwise patterned topology, as illustrated in FIG. 1, wherein an anti-glare film or coating 14 has been applied to the surface 12 of a glass screen or panel 10. As is apparent by the representative shape of the upper or exposed surface 16 of the film or coating 14, the topology or texture of the film is not smooth and flat, but is patterned in order to enhance diffusion of reflected light. Depending upon the particular angle of the surface 16, representative light rays B and C are reflected at different angles, diffusing the light and reflected image of the light source. Some rays of light will be incident at such an angle as to pass through the coating, as in light ray A, and thereafter be reflected by the surface 12 of glass screen or panel 10. Such light rays will be diffused relative to those light rays reflected at the surface 16, and will also be refracted to an extent which depends upon the index of refraction of the film or coating 14.

The particular topology of the coating is as already known in the art, and does not form a part of this invention in and of itself. Accordingly, the particular advantages and disadvantages of different surface topologies will not be discussed in detail. The nature of the invention is such that significant savings can be achieved by using coatings according to this invention to form whatever surface topology is desired. The gloss reading, as measured by a conventional gloss meter, such as a "Gardner" meter, will reflect the extent of the diffusion resulting from the patterned topology of the coating. The gloss reading will also be a function of the intensity of the reflected light. The intensity depends upon the refractive index of the coating and its absorption characteristics.

Figure 2:
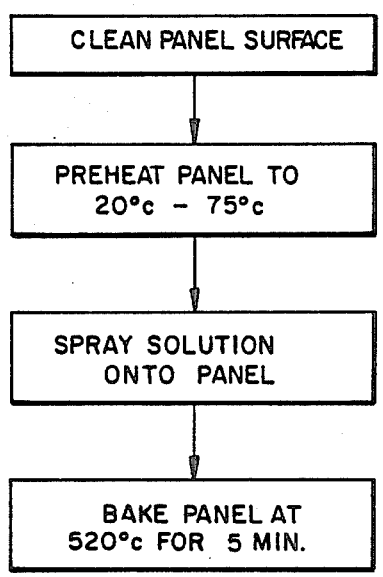
FIG. 2 is a block diagram illustrating a method according to this invention for applying an anti-glare coating to an optical glass screen or panel; and, FIG. 3 is a diagrammatic illustration of the manner in which a film formed by an anti-glare coating according to this invention is stabilized and bonded to a glass surface by baking.

The basic steps according to this method for applying an anti-glare coating are illustrated in FIG. 2. The general scheme of applying the solution includes steps which are generally included in prior art methods, such as spraying the solution onto the panel and baking the panel and solution to stabilize the coating. Nevertheless, such basic steps are modified according to the particular coatings according to this invention, and the solutions from which they are formed. As a first step, one must insure that the surface to be coated is clean and free of contaminants which would prevent proper stabilization and bonding of the film to the glass screen or panel. Depending upon the production stage at which the coating is applied, a special cleaning step may or may not be necessary.

The clean glass screens or panels are preheated to a temperature in the range of approximately 20° C. to 75° C. Such higher temperatures produce a more defined topology of the surface 16 of the film or coating 14, thereby providing a greater diffusion effect.

After preheating, the solution from which the coating is formed is applied to the surface of the optical glass screen or panel. The solution is in effect a partially hydrolized metal alkoxide polymer, in which a proper proportion of metal alkoxides are dissolved. Although the coating may be applied in a number of ways, the presently preferred method is to spray on the solution with an air gun. Certain parameters in particular related to application by spraying will effect the coating. The principal parameters include the size and shape of the spraying head, the distance of the spraying gun from the surface of the panel during application, the amount of air pressure driving the spray gun, the number of coatings or passes over the panel by the spray gun and the liquid pressure of the solution delivered to the spray head and the relative speed of the travel between the spray gun and the panel. Higher liquid pressure or head, measured in inches, will produce films with less haze, but flatter topology. Bringing the spray gun closer to the surface of the panel produces the same effect as high liquid head. Increasing the air pressure driving the spray gun produces finer droplets and more diffusion, but the film tends to have more haze. The greater the number of passes, the thicker the film will be. The thicker the film, the greater the extent of glare reduction. However, if the film becomes too thick, it will be prone to cracking.

Figure 3:
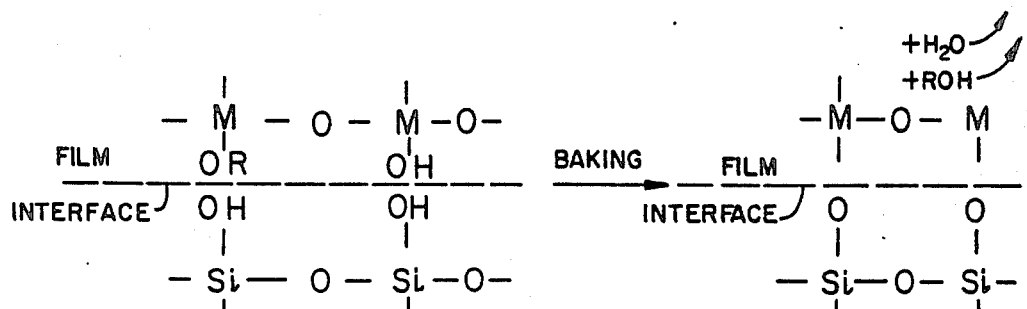

After the solution has been applied, the coating must be bonded and stabilized to the glass surface as shown in FIG. 3. This is accomplished by baking the panel and the solution applied thereto at a temperature in the range of approximately 500° C. to 550° C. for a sufficient amount of time to drive off the solvent and water in the solution, leaving a silica-titania-zirconia glass. The partially hydrolized metal alkoxides in the solution have the general formula $[M(OR)_{2-x}(OH)_x]_n$ as shown on the film side of the film/glass interface before baking. At the elevated baking temperature, the OR and OH group of the polymer bonds with the SiOH group of the glass surface, forming an alcohol and water. This alcohol and water is then evaporated from the coating. As a result, the coating becomes dense and chemically bonded to the glass surface. When the baking is complete, the solution has completely evaporated, leaving a silica titania-zirconia glass as the anti-glare coating. As set forth in FIG. 2, it has been found that baking at a temperature of approximately 520° C. for approximately five minutes is sufficient.

Six different formulations of solutions for forming coatings according to this invention were prepared and tested, the formulations being designated by Roman numerals I–VI. The ingredients of each formulation have been labeled by lower case letters to facilitate comparisons of the quantities of ingredients or components in the formulations.

Formulation No. I (a) 101.8 ml of 2-propanol
(b) 37.0 gm TEOS
(c) 3.18 ml $H_2O$ + 0.5 ml $HNO_3$
(d) 5.5 gm TPT (titanium isopropoxide; $Ti(OC_3H_7)_4$)
(e) 1.6 ml $H_2O$ + 6.0 ml 2-propanol Initially, the TEOS (b) was mixed into the 2-propanol (a), the mixture being then heated to a temperature of approximately 55° C. After heating, the water and nitric acid (c) were added and mixed during a period of approximately thirty minutes. Thereafter, the TPT (d) was added and mixed during a period of approximately fifteen minutes. Finally, the additional water and additional 2-propanol (e) were added and mixed during a period of approximately one and one half hours. At this point, the solution was ready for application to the glass screen or panel, preferably by spraying.

Each of the following formulations was prepared in the same fashion. Components or sets of components (a) and (b) were mixed and heated; (c) were added and mixed; (d) was (were) added and mixed; and, (e) were added and mixed.

Formulation No. II (a) 80.0 gm 2-propanol
(b) 41.0 gm TEOS
(c) 3.55 ml $H_2O$ + 0.7 ml $HNO_3$
(d) 3.36 gm TBT (titanium butoxide; $Ti(OC_4H_9)_4$) + 3.63 gm zirconium n-propoxide ($Zr(OC_3H_7)_4$)
(e) 1.78 ml $H_2O$ + 8.0 ml 2-propanol Formulation No. III (a) 101.8 ml 2-propanol
(b) 39.8 gm TEOS
(c) 3.2 ml $H_2O$ + 0.5 ml $HNO_3$
(d) 6.72 gm TBT
(e) 1.6 ml $H_2O$ + 6.0 ml 2-propanol Formulation No. IV (a) 80.0 gm 2-propanol
(b) 45.22 gm TEOS
(c) 3.91 ml $H_2O$ + 0.7 ml $HNO_3$
(d) 6.72 gm TBT
(e) 1.95 gm $H_2O$ + 6 ml 2-propanol Formulation No. V (a) 108.0 ml 2-propanol
(b) 41.07 gm TEOS
(c) 0.7 ml $HNO_3$ + 3.55 ml $H_2O$
(d) 5.76 gm TBT + 0.93 gm $Zr(OC_3H_7)_4$
(e) 1.78 ml $H_2O$ + 6.0 ml 2-propanol Formulation No. VI (a) 110.0 ml 2-propanol
(b) 41.07 gm TEOS
(c) 0.7 ml $HNO_3$ + 3.55 ml $H_2O$
(d) 3.36 gm TBT + 3.625 gm $Zr(OC_3H_7)_4$
(e) 1.78 ml $H_2O$ + 8.0 ml 2-propanol

EXAMPLE 1

Example 1 utilized formulation I, and was intended to demonstrate the effects of fluid pressure or head. During the first part of example 1 the distance from the spray gun to the float glass panel surface was 11 inches, the air pressure 35 psig (pounds per square inch gauge) and the coating was formed from three passes of the spray gun. When the fluid pressure or head was 17.5 inches the gloss reading was 131; the prior reading was 154. When the fluid head or pressure was increased to 35 inches the gloss reading increased to 138.

In the second part of example 1 the distance of the spray gun to the panel was 11 inches, the air pressure was 45 psig and the coating was formed by six passes of the spray gun. When the fluid pressure was 17.5 inches, the gloss reading was 122. When the fluid pressure was raised to 35 inches the gloss reading remained 122.

EXAMPLE 2

Example 2 used formulation I and was intended to demonstrate the effect of the distance of the spray gun from the flow glass surface. During this test, the air pressure was 45 psig, the fluid pressure was 17.5 inches and the coating was formed by three passes of the spray gun. When the distance from the spray gun to the panel was 11 inches the gloss reading was 122. When the distance from the spray gun to the panel was increased to 12 inches the gloss reading increased to 141.

EXAMPLE 3

Example 3 utilized formulation II, and was intended to demonstrate the effect of the number of passes of the spray gun used to form the coating. In this test, the air pressure was 47 psig, the fluid pressure was 18.5 inches and the distance from the spray gun to the CRT screen panel was 11¾ inches. In the absence of any coating, the gloss reading was 88.5±3.6. When the coating was formed from three passes of the spray gun the gloss reading was 66.2±4. When the coating was formed from four passes of the spray gun the gloss reading was 61±3.7.

EXAMPLE 4

Example 4 utilized formulation II, and was intended to demonstrate the effect of preheating the optical glass screen or panel. In part 1 of this test the air pressure was 47 psig, the fluid pressure was 18 inches, the distance from the spray gun to the panel was 11¾ inches and the coating was applied by five passes of the spray gun. In the absence of any coating the gloss reading was 89.4±1.9. When the coating was applied after preheating the panel between 45° C. and 50° C. the gloss reading was 62.2±2.7. When the coating was applied after preheating the panel to 60° C. the gloss reading was 53±3.

In part 2 of this test the air pressure was 47 psig, the fluid pressure was 18.5 inches, the distance from the spray gun to the panel was 11¾ inches and the coating was applied by four passes of the spray gun. In the absence of a coating the gloss reading was 88.5±3.6. When the coating was applied after preheating the panel to a temperature between 58° C. and 60° C. the gloss reading was 61±3.7. When the solution was applied after preheating the panel to 67° C. the gloss reading was 60.8±4.1. When the coating was applied after preheating the panel to 77° C. the gloss reading was 58.5±3.3.

EXAMPLE 5

Parts 1 and 2 of this test utilized formulations III and IV respectively, and were intended to demonstrate the effect of a reduction in the amount of metal alkoxide. The parameters of this test were held constant for both parts 1 and 2, except as noted. In part 1 of this test the molar ratio of $SiO_2:TiO_2$ was 9.65:1. The coating was applied by five passes of the spray gun. The gloss reading was 72.7±2.5.

In part 2 of this test, the molar ratio of $SiO_2:TiO_2$ was increased to 11:1, while the thickness of the coating was reduced by applying the coating with only four passes of the spray gun. In this part the gloss reading was 65.4±2.2.

EXAMPLE 6

This test utilized formulation II, and was intended to demonstrate that additional coatings could be applied after an initial baking of prior coatings. During this test the air pressure was 47 psig, the fluid pressure was 18 inches and the distance from the spray gun to the panel was 11¾ inches. A first coating was applied by three passes of the spray gun and baked at a temperature of 520° C. for approximately seven minutes. The gloss reading was 70.5±3.1. Thereafter, more solution was applied by three additional passes of the spray gun, and once again the panel was heated to a temperature of approximately 520° C. for approximately seven minutes. The gloss reading after the second application was 64.8±3.

EXAMPLE 7

Parts 1 and 2 of this test were made with formulations V and VI respectively, and were intended to demonstrate that changing the ratio of $TiO_2$ to $ZrO_2$ did not significantly alter the gloss reading, although zirconium imparts better alkali resistance to the stabilized film than does titanium. In each of parts 1 and 2 the parameters were held constant. In each of parts 1 and 2 the solution included 0.2 moles of $SiO_2$. In part 1 the molar ratio of $TiO_2:ZrO_2$ was 5.67:1. The gloss reading was 74.5±2.5.

In part 2, the molar ratio of $TiO_2:ZrO_2$ was 1:1. The gloss reading as 75.5±1.3.

On the basis of the tests conducted with the various formulations of solution noted herein, the best solution from which to form coatings according to this invention appears to be that of formulation II. Based upon the amounts of components listed, it can be shown that formulation II will result in a coating mixture comprising approximately 11.83 gm $SiO_2$, approximately 0.79 gm $TiO_2$ and approximately 1.26 gm $ZrO_2$. The $TiO_2$ and $ZrO_2$ therefore form approximately 15% of the solid, by weight. It can also be shown that the formulation results in approximately 0.197 moles of $SiO_2$, 0.01 moles of $TiO_2$ and approximately 0.01 moles of $ZrO_2$. Accordingly, the molar ratio of $(TiO_2+ZrO_2)$ is about 10% of the solids in the mixture $(SiO_2+TiO_2+ZrO_2)$.

This invention may be embodied in other specific forms without departing from the spirit or essential attributes thereof. Accordingly, reference should be made to the appended claims, rather than to the foregoing specification, as indicating the scope of the invention.

What is claimed is:

1. In a cathode ray tube having an optical glass screen, the improvement wherein said optical glass screen is coated exteriorly with a mixture of a solid of partially hydrolized metal alkoxides, the metal alkoxides having the general formula $M(OR)_4$ where M is selected form the group consisting of silicon, titanium and zirconium, wherein the metal alkoxides comprise $SiO_2$ and $ZrO_2$ and wherein the $SiO_2$ forms approximately 85% of the solid mixture by weight.

2. A cathode ray tube according to claim 1, wherein the metal alkoxides comprise equivalent titanium and zirconium oxides, the equivalent titanium and zirconium oxides forming approximately 10% of the solid mixture, by molar ratio and wherein the $SiO_2$ forms approxiamtely 90% of the solid mixture, by molar weight.

3. A cathode ray tube according to claim 1, wherein the metal alkoxides comprise equivalent titanium and zirconium oxides, the equivalent titanium and zirconium oxides forming approximately 15% of the solid mixture, by weight.

4. A cathode ray tube according to claim 1, and a solution, the solution comprising an alcohol and water, the water having a molar ration of 1.3 to 1.6 to $SiO_2$, the water being used for hydrolysis of $M(OR)_4$.

5. A cathode ray tube according to claim 4 wherein the solid mixture comprises between 10% and 20% by weight and the solution comprises between 80% and 90% by weight.

* * * * *